(12) United States Patent
Hirayama

(10) Patent No.: US 7,639,951 B2
(45) Date of Patent: Dec. 29, 2009

(54) CONTENTS-DELIVERY SYSTEM, CONTENTS-TRANSMISSION DEVICE, CONTENTS-RECEPTION DEVICE, AND CONTENTS-DELIVERY METHOD

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 11/135,595

(22) Filed: May 23, 2005

(65) Prior Publication Data

US 2005/0276610 A1 Dec. 15, 2005

(30) Foreign Application Priority Data

May 25, 2004 (JP) ............... 2004-154832

(51) Int. Cl.
*H04B 10/00* (2006.01)
(52) U.S. Cl. ............ 398/128; 398/115; 398/116; 398/118; 398/129; 398/130; 398/131
(58) Field of Classification Search ......... 398/115–131; 370/432, 444; 340/825; 710/1
See application file for complete search history.

(56) References Cited

U.S. PATENT DOCUMENTS

| | | | | |
|---|---|---|---|---|
| 4,114,592 | A | * | 9/1978 | Winston .................. 126/683 |
| 5,539,393 | A | * | 7/1996 | Barfod ................ 340/825.52 |
| 6,055,637 | A | * | 4/2000 | Hudson et al. ............... 726/20 |
| 6,895,445 | B2 | * | 5/2005 | Ying et al. .................... 710/1 |
| 7,120,363 | B2 | * | 10/2006 | Andreu-von Euw et al. . 398/129 |
| 7,140,035 | B1 | * | 11/2006 | Karch .......................... 726/1 |
| 2002/0131121 | A1 | * | 9/2002 | Jeganathan et al. ......... 359/152 |
| 2002/0167961 | A1 | * | 11/2002 | Haartsen .................... 370/444 |
| 2004/0037567 | A1 | * | 2/2004 | Tjerneld et al. ............. 398/127 |
| 2004/0062551 | A1 | * | 4/2004 | ElBatt et al. ................ 398/115 |
| 2004/0252997 | A1 | * | 12/2004 | Bolduc et al. ............... 398/115 |
| 2004/0258415 | A1 | * | 12/2004 | Boone et al. ................ 398/125 |

(Continued)

FOREIGN PATENT DOCUMENTS

JP 09-153858 * 10/1997

OTHER PUBLICATIONS

Pesavento et al: "IEEE Access Standards, 802.2ah GE-PON Status", ITU-T Workshop IP/Optical, Chitose, Japan, Jul. 9-11, 2002, pp. 1-15.*

*Primary Examiner*—Ken N Vanderpuye
*Assistant Examiner*—Li Liu
(74) *Attorney, Agent, or Firm*—Frommer Lawrence & Haug LLP; William S. Frommer; Thomas F. Presson

(57) ABSTRACT

A contents-delivery system has a contents-transmission device transmitting the contents, and a contents-reception device receiving the contents from the transmission device. A first communication device performs communication from the transmission device to the reception device via a high-directivity transmission carrier. A second communication device performs communication at least from the reception device to the transmission device. An optical position confirmation device permits it through optical irradiation to confirm that a position of the reception device with respect to the transmission device is within a range in which the first communication device can communicate. A position of the reception device is matched with the transmission device based on an irradiation position of visible light. It is thus possible to locate the reception device to a communication-enabled position if the reception device is directed against the transmission device.

27 Claims, 11 Drawing Sheets

U.S. PATENT DOCUMENTS

2005/0002673 A1* 1/2005 Okano et al. ................ 398/130
2005/0008158 A1* 1/2005 Huh et al. ................... 380/256
2005/0100036 A1* 5/2005 Davis ........................ 370/432

* cited by examiner

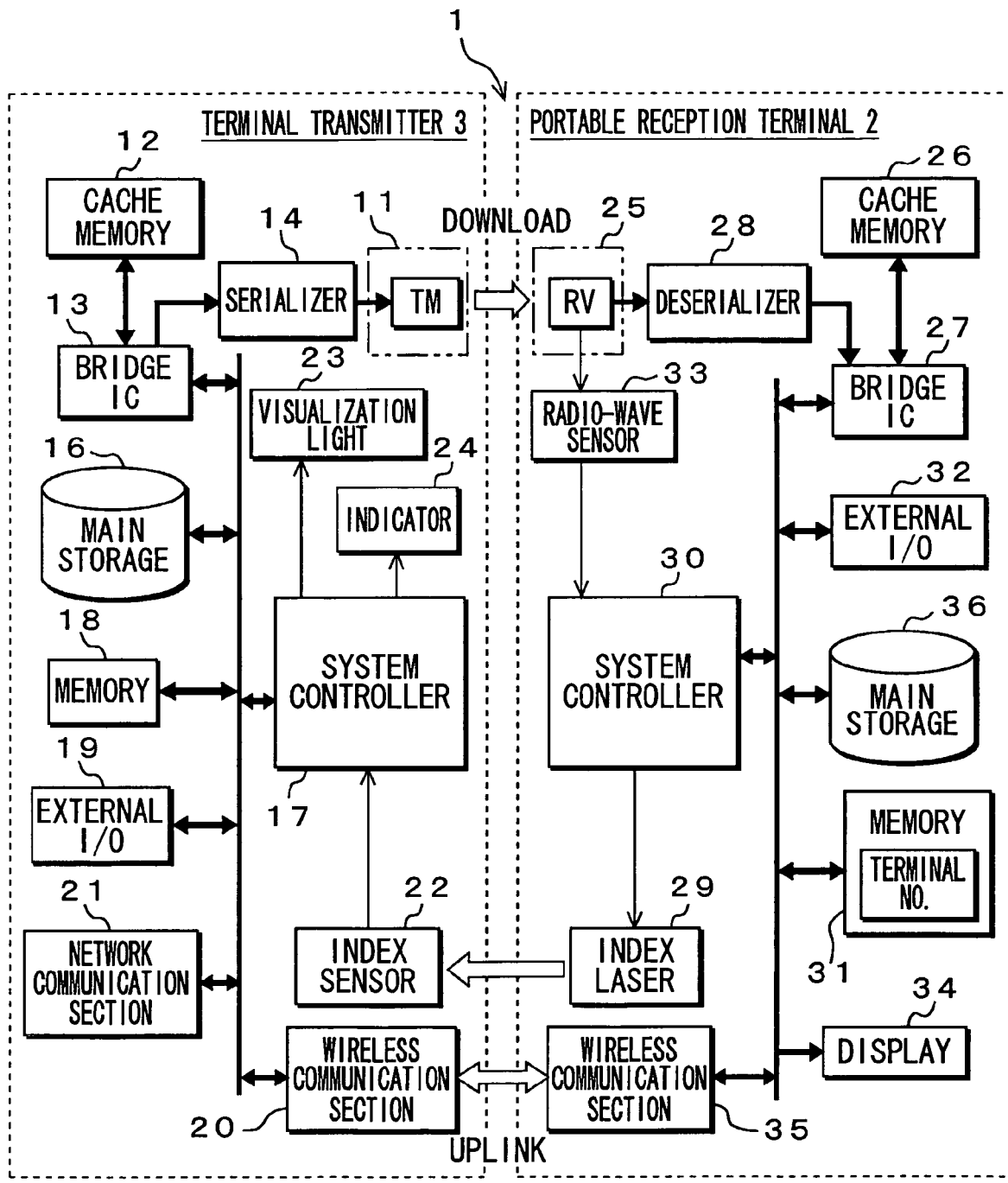
F I G. 2

| TERMINAL NO. | DATA FILE NAME |
|---|---|
| MD-101 | DF-00845 |
| MD-211 | DF-00845 |
| MD-215 | DF-00021 |
| MD-241 | DF-00001 | ns-DELIVERY SYSTEM, CONTENTS-TRANSMISSION DEVICE, CONTENTS-RECEPTION DEVICE, AND CONTENTS-DELIVERY METHOD

CROSS REFERENCE TO RELATED APPLICATION

The present invention contains subject matter related to Japanese Patent Application JP 2004-154832 filed in the Japanese Patent Office on May 25, 2004, the entire contents of which being incorporated herein by reference.

BACKGROUND OF THE INVENTION

1. Field of the Invention

The present invention relates to a contents-delivery system for delivering contents, a contents-transmission device and a contents-reception device that make up this contents-delivery system, and a contents-delivery method to enable non-contact type optical communication. More particularly, it relates to a contents-delivery system for performing communication between a contents-transmission device and a contents-reception device at a place having high publicity such as a street.

2. Description of Related Art

To realize delivery of contents at a place having high publicity such as a street, it is necessary to do so with a simple operation and in short time because an unspecified number of users utilize the system.

By a method of utilizing an electrical cable as contents transmitting means, it may be impossible to deliver contents having a large capacity in short time. Therefore, a contents-delivery system has been proposed which utilizes optical communication.

By a method of utilizing optical communication as contents transmitting means, first, use of an optical fiber is thought of. However, a connector of an optical fiber cable has low durability against repetitive attachment and detachment and so is not suitable for a system utilized by an unspecified number of users.

Therefore, such a system has been proposed as to enable non-contact type optical communication.

SUMMARY OF THE INVENTION

To enable non-contact type optical communication, it is important to align a transmitting side and a receiving side with each other. Therefore, this system aligns the transmitting side and the receiving side with each other mechanically and so it is difficult to attach and detach them.

Further, since such the non-contact type system has some regions that come in contact with each other mechanically, the system has lower durability against repetitive attachment and detachment.

It is desirable to provide a contents-delivery system that facilitates alignment of a contents-reception device with respect to a contents-transmission device, the contents-transmission device and the contents-reception device that make up this contents-delivery system, and the contents-delivery method.

According to an embodiment of the present invention, there is provided a contents-delivery system which delivers contents by performing communication. The system has a contents-transmission device transmitting the contents and a contents-reception device receiving the contents from the contents-transmission device. The system also has a first communication device performing communication from the contents-transmission device to the contents-reception device via a high-directivity transmission carrier and a second communication device performing communication at least from the contents-reception device to the contents-transmission device. The system further has an optical position confirmation device permitting it through optical irradiation to confirm that a position of the contents-reception device with respect to the contents-transmission device is within a range in which the first communication device can communicate.

In the embodiment of the contents-delivery system related to the present invention, a position of the contents-reception device is matched with the contents-transmission device based on an irradiation position of visible light. It is thus possible to locate the position of the contents-reception device with respect to the contents-transmission device to a communication-enabled position.

According to another embodiment of the invention, there is also provided a contents-transmission device which delivers contents by communicating with a contents-reception device. The contents-transmission device has first communication device performing communication to the contents-reception device via a high-directivity transmission carrier and second communication device receiving communication at least from the contents-reception device. The contents-transmission device also has optical position confirmation device permitting it through optical irradiation to confirm that a position of the contents-reception device is within a range in which the first communication device can communicate.

By the embodiment of the contents-transmission device related to the present invention, a position of the contents-reception device is matched with a position of the contents-transmission device based on an irradiation position of visible light. It is thus possible to locate the contents-reception device with respect to the contents-transmission device to a position where these devices can communicate with each other.

According to further embodiment of the invention, there is also provided a contents-reception device which receives delivery of contents by communicating with a contents-transmission device. The contents-reception device has first communication device receiving communication from the contents-transmission device via a high-directivity transmission carrier and second communication device performing communication at least to the contents-transmission device. The contents-reception device also has optical position confirmation device permitting it through optical irradiation to confirm that a position with respect to the contents-transmission device is within a range in which the first communication device can communicate.

By the embodiment of the contents-reception device related to the present invention, a position of this contents-reception device is matched with a position of a contents-transmission device based on an irradiation position of visible light. It is thus possible to locate the contents-reception device with respect to the contents-transmission device to a position where these devices can communicate with each other.

According to additional embodiment of the invention, there is also provided a contents-delivery method for delivering contents by performing communication between a contents-transmission device and a contents-reception device. The method includes the step of, by the contents-reception device, outputting identification information that identifies itself, as a download request. The method also includes the step of, in response to the download request from each of the contents-reception devices, by the contents-transmission device, outputting the identification information received from an arbitrary one of the contents-reception devices and an exclusive control signal. The method also includes the step of, by any one of the contents-reception devices that has received the identification information and the exclusive control signal, performing contents-reception processing if the received identification information is of its own. The method also includes the step of, if the received identification information is not of its own, temporarily stopping the contents-reception processing by using the exclusive control signal.

According to the embodiment of the contents-delivery method related to the present invention, the contents-reception device outputs identification information that identifies itself as a download request, in response to the download request from each of the contents-reception devices, the contents-transmission device outputs the identification information received from an arbitrary one of the contents-reception devices and an exclusive control signal.

Any one of the contents-reception devices that has received the identification information and the exclusive control signal performs reception processing of contents if this received identification information is of itself and, otherwise, temporarily stops the reception processing of the contents based on the exclusive control signal.

According to the above embodiments of the present invention, a position of the contents-reception device can be matched with a position of the contents-transmission device based on an irradiation position of visible light, so that it is possible to align the position of the contents-reception device to the position of the contents-transmission device in which they can communicate with each other via a high-directivity transmission carrier even if they are arranged as separated from each other by a predetermined distance.

It is thus possible to deliver large-capacity contents even between the contents-transmission device and the contents-reception device even if they are arranged in a mechanically non-contacting manner. Further, since they do not come in contact with each other mechanically so that durability may be improved, it is possible to inexpensively make up a system that delivers contents to an unspecified number of utilizers.

Further, by making communication by way of a high-directivity transmission carrier unidirectional from the contents-transmission device to the contents-reception device, the alignment can be facilitated further, thereby realizing rapid delivery of contents through synergy effects of ease of operations and high-speed communication.

Further, according to the above embodiments of the present invention, if the contents-transmission device has received content download requests from the plurality of contents-reception devices, it is possible to temporarily stop reception processing on those reception devices other than an arbitrary one and so deliver contents to one of the plurality of contents-reception devices in a condition where they are arranged as separated from the contents-transmission device by the predetermined distance.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 2 is a block diagram for illustrating a configuration of the embodiment of the contents-delivery system according to the present invention;

DESCRIPTION OF THE PREFERRED EMBODIMENTS

The following will describe embodiments of a contents-delivery system, a contents-transmission device, a contents-reception device, and a contents-delivery method of the present invention with reference to drawings.

<Outline of Contents-Delivery System>

Figure 1:
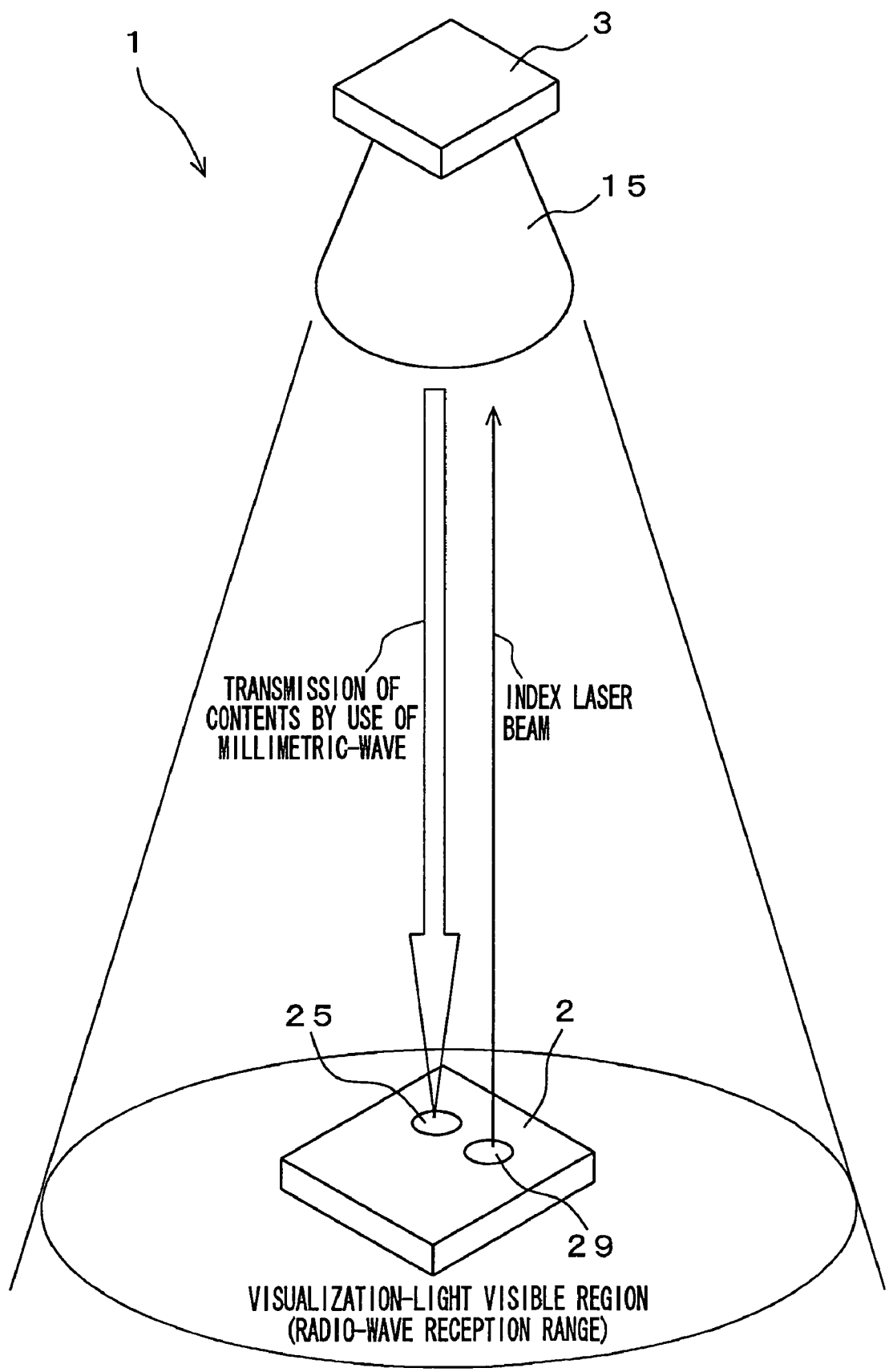
FIG. 1 is a diagram for illustrating an outline of an embodiment of a contents-delivery system according to the present invention.

FIG. 1 is a diagram of an outline of an embodiment of a contents-delivery system according to the present embodiment. The contents-delivery system 1 of the present embodiment has such a configuration that a portable reception terminal 2 is located within a predetermined range with respect to a terminal transmitter device 3 so that the terminal transmitter device 3 may deliver contents such as a video and music to the portable reception terminal 2.

The terminal transmitter device 3 is equipped with a transmission section that transmits a millimetric-wave having a frequency such as 60 GHz. The portable reception terminal 2, on the other hand, is equipped with an optical irradiation device for irradiating a laser beam for use in an index laser that permits a user to recognize whether the terminal 2 is directed toward the terminal transmitter 3.

The millimetric-wave goes straight and can transmit a lot of information but has high directivity, so that it is important to align the transmission side and the reception side. In the present embodiment, if the portable reception terminal 2 is directed so that the index laser can irradiate the terminal transmitter 3, the portable reception terminal 2 is located so that it can receive a radio-wave from the terminal transmitter 3, thereby enabling delivering contents etc. in a simple configuration.

<Specific Configuration of Contents-Delivery System of the Present Embodiment>

Figures 3, 5:
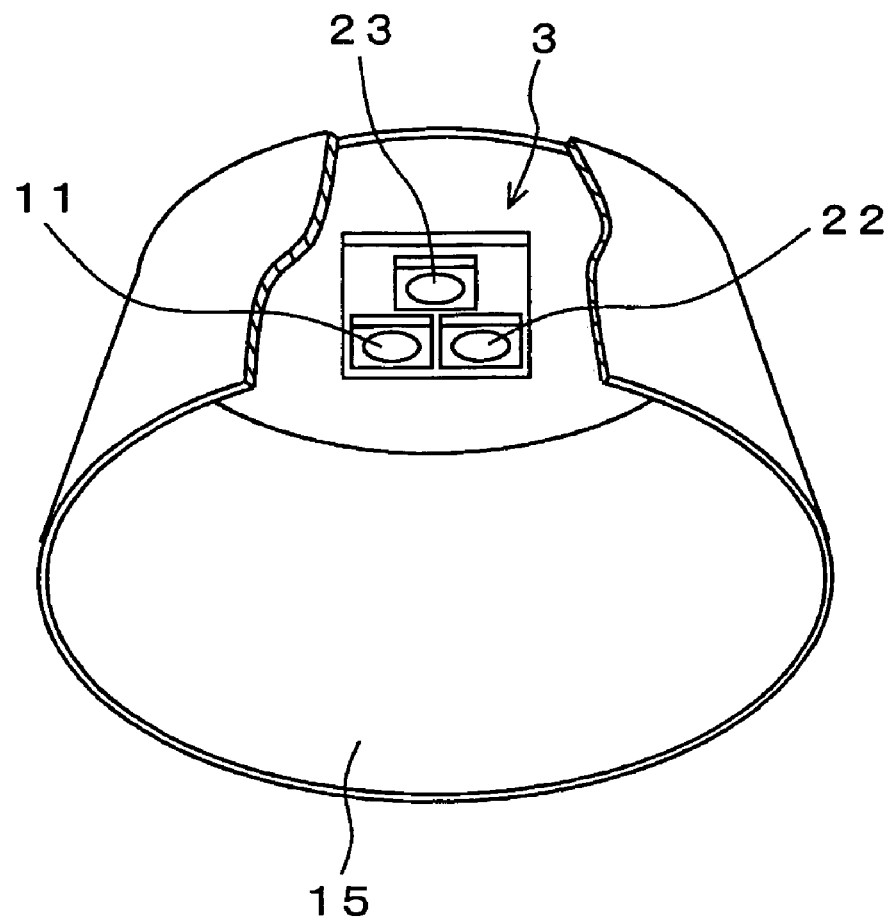
FIG. 3 is a partially exploded perspective diagram for illustrating a configuration of an embodiment of a terminal transmitter according to the present invention.
FIG. 5 is a table for indicating one example of a delivery-permitted terminal number.

FIG. 2 is a block diagram for showing a configuration of an embodiment of the contents-delivery system 1 according to the present invention and FIG. 3 is a partially exploded perspective diagram for illustrating a configuration of an embodiment of the terminal transmitter according to the present invention. The following will describe specific configurations of the terminal transmitter 3 and the portable reception terminal 2.

The terminal transmitter 3 is one example of the contents-transmission device and installed on a ceiling, a wall, a floor, etc., while a terminal transmitter 3 is equipped with the transmission section 11, a cache memory 12, a bridge IC 13, and a serializer 14. It is to be noted that FIG. 1 shows an example where it is installed on the ceiling.

The transmission section 11 is one example of a download transmission device and makes up first communication means. The transmission section 11 is equipped with an antenna etc. for outputting a millimetric-wave having a frequency of 60 GHz as a transmission carrier.

The cache memory 12 is one of a so-called high-speed storage device and made up of an RAM etc., to store a data file of contents output from the transmission section 11.

The bridge IC 13 is used to read the data files from the cache memory 12. It is used also to write the data files to the cache memory 12.

The serializer 14 is used to convert a parallel data file read from the cache memory 12 by the bridge IC 13 into serial data and sends it to the transmission section 11.

Further, the terminal transmitter 3 is equipped with a main storage 16, a system controller 17, a memory 18, and an external I/O 19. The main storage 16 is one example of a so-called low-speed storage device and made up of, for example, a hard disk drive (HDD) etc., to store a data file to be transferred to the cache memory 12.

The system controller 17 is made up of a CPU etc., to control delivery of contents. The memory 18 is made up of an RAM, an ROM, etc., to store a program etc. to be executed in the system controller 17. The external I/O 19 is one example of input/output means and will be, for example, an operation section.

Furthermore, the terminal transmitter 1 is equipped with a wireless communication section 20 and a network communication section 21. The wireless communication section 20 is one example of an uplink reception device and makes up second communication means. The wireless communication section 20 is engaged in communication with the portable reception terminal 2 and so needs only to be capable of short-range communication, so that, for example, a Bluetooth or an IEEE802.11 device may be used as it.

The network communication section 21 is connected via the Internet or a dedicated line to a server device etc. which delivers contents, not shown.

Further, the terminal transmitter 3 is equipped with an index sensor 22, a visualization light 23, and an indicator 24. The index sensor 22 is one example of light detection means and arranged adjacent to an antenna, not shown, of the transmission section 11 as shown in FIG. 3. The index sensor 22 is made up of, for example, a light sensor etc. equipped with, for example, a light receiving element.

It is to be noted that by superimposing a terminal number etc. on a laser beam from a later-described index laser, the index sensor 22 can receive also a control signal such as the terminal number. Therefore, the second communication means may be made up of the index sensor 22.

The visualization light 23 is one example of light emitting means and arranged adjacent to the antenna, not shown, of the transmission section 11. It is to be noted that the terminal transmitter 3 is equipped with a light guide 15 as shown in FIG. 3 so that a position from which the visualization light 23 can be seen may fall in a range within which a radio-wave can be received.

The light guide 15 is one example of guide means and comes in a conical or cylindrical cover, so that when the terminal transmitter 3 is installed on the ceiling as shown in FIG. 1 and if this light guide 15 is located below the terminal transmitter 3, a user can see the visualization light 23.

At a place where the user can see the visualization light 23, by arranging the portable reception terminal 2 to a predetermined position, it is possible to receive radio-wave having high directivity from the transmission section 11. At a place where the user cannot see the visualization light 23 because of the light guide 15, on the other hand, it is possible to recognize that radio-wave from the transmission section 11 cannot be received.

The indicator 24 is one example of notification means and notifies the user of a communication state etc.

It is to be noted that if the index sensor 22 has detected an index laser beam from the later-described portable reception terminal 2, a lighting state of the visualization light 23 may be changed. In this case, the visualization light 23 serves as the notification means. Therefore, in the present embodiment, the visualization light 23 is configured so as to emit lights having two different colors.

Next, a configuration of the portable reception terminal 2 will be described. The portable reception terminal 2 is equipped with a reception section 25, a cache memory 26, a bridge IC 27, and a deserializer 28. The reception section 25 is one example of a download reception device and paired with the transmission section 11 to make up the first communication means. The reception section 25 is equipped with an antenna etc. for receiving a millimetric-wave having a frequency such as 60 GHz etc.

The cache memory 26 is one of a so-called high-speed storage device and made up of an RAM etc., to store a data file received from the terminal transmitter 3. The bridge IC 27 is used to write data files to the cache memory 26. It is used also to read the data files from the cache memory 26.

The deserializer 28 is used to convert a serial data file received by the reception section 25 into parallel data and sends it to the bridge IC 27.

The portable reception terminal 2 is equipped with also a system controller 30, a memory 31, and an external I/O 32. The system controller 30 is made up of a CPU etc. and controls storage of a data file received by the reception section 25 into the cache memory 26, read-out of the data file from the cache memory 26, etc.

The memory 31 is made up of an RAM, an ROM, etc., to store a program etc. to be executed in the system controller 30. The external I/O 32 is one of input/output means and comes in, for example, an operation section.

The portable reception terminal 2 is further equipped with an index laser 29, a radio-wave sensor 33, and a display 34. The index laser 29 makes up optical position confirmation means, being one example of optical irradiation means for emitting a visible light beam or directive visible light.

It is to be noted that these sections are arranged in such a manner that the reception section 25 can receive a radio-wave from the transmission section 11 properly when the index sensor 22 in the terminal transmitter 3 is irradiated with an index laser beam. Therefore, for example, an antenna, not shown, of the reception section 25 may be vertical to a direction of a laser beam emitted from the index laser 25.

It is to be noted that by superimposing a terminal number etc. on a laser beam from the index laser 29, the index laser 29 can transmit the control signal including the terminal number. Therefore, the index laser 29 is one example of an uplink transmission device and makes up the second communication means.

The radio-wave sensor 33 detects whether the reception section 25 has received radio-wave. The display 34 is one example of notification means, to notify the user of a communication state etc.

The portable reception terminal 2 is equipped also with a wireless communication section 35. The wireless communication section 35 is one example of the uplink reception device and paired with the wireless communication section 20 in the terminal transmitter 3 to make up the second communication means. The wireless communication section 35 needs only to have the same communication function as the wireless communication section 20, so that, for example, a Bluetooth or IEEE802.11 device may be used as it.

It is to be noted that the portable reception terminal 2 may be equipped with a main storage 36. The main storage 36 is one example of the low-speed storage device and made up of a hard disk drive etc., to store a data file to be transferred to the cache memory 26.

The main storage 36 has a larger capacity than the cache memory 26, so that by transferring a data file of contents delivered from the terminal transmitter 3 and stored in the cache memory 26 to the main storage 36 and storing this data file in it, the contents can be saved in the portable reception terminal 2.

<First Operation Example of an Embodiment of a Contents-Delivery System According to the Present Invention>

Figure 4A:
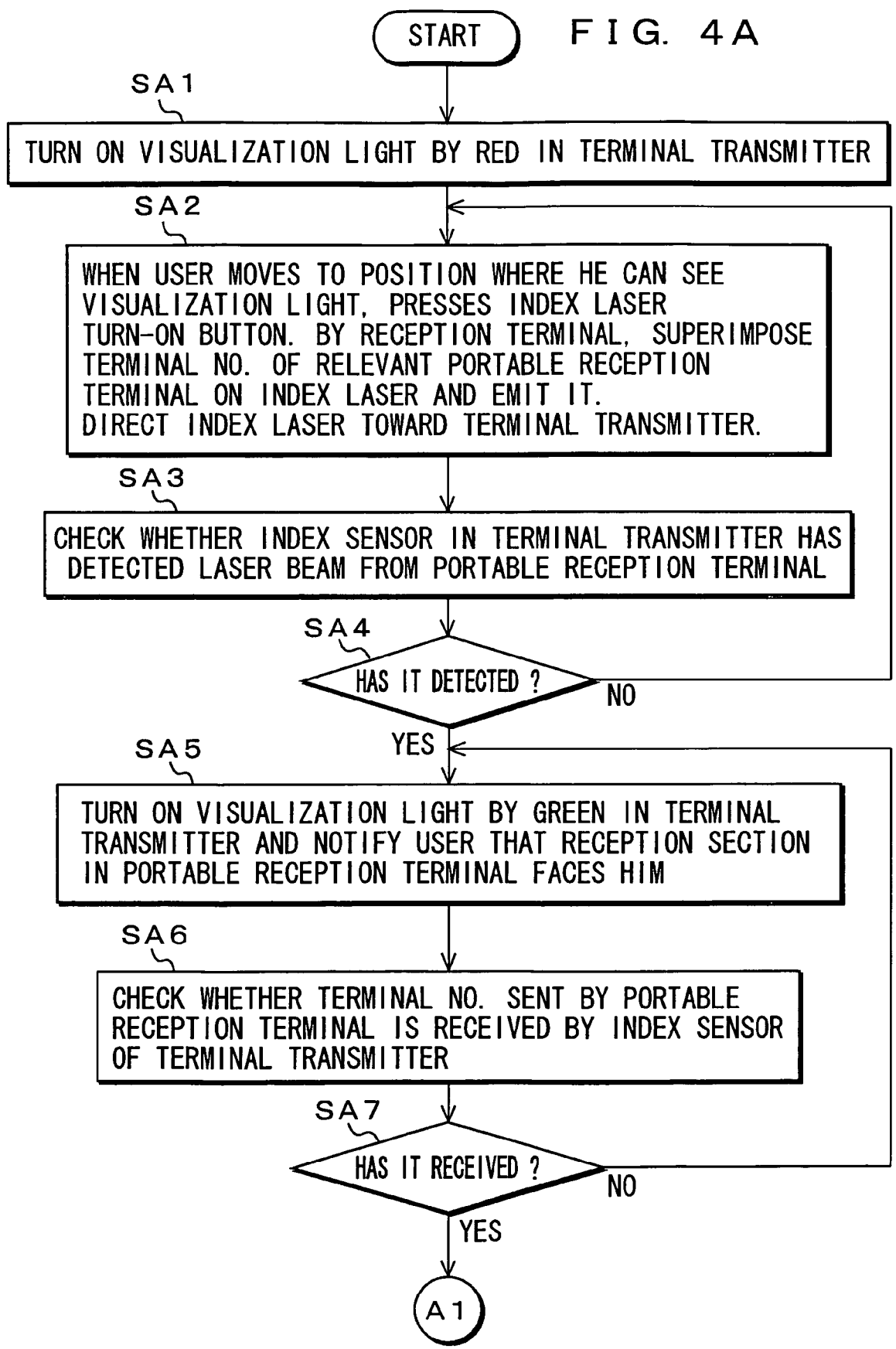
FIGS. 4A and 4B are flowcharts of a first operation example of an embodiment of the contents-delivery system according to the present invention.
Figure 4B:
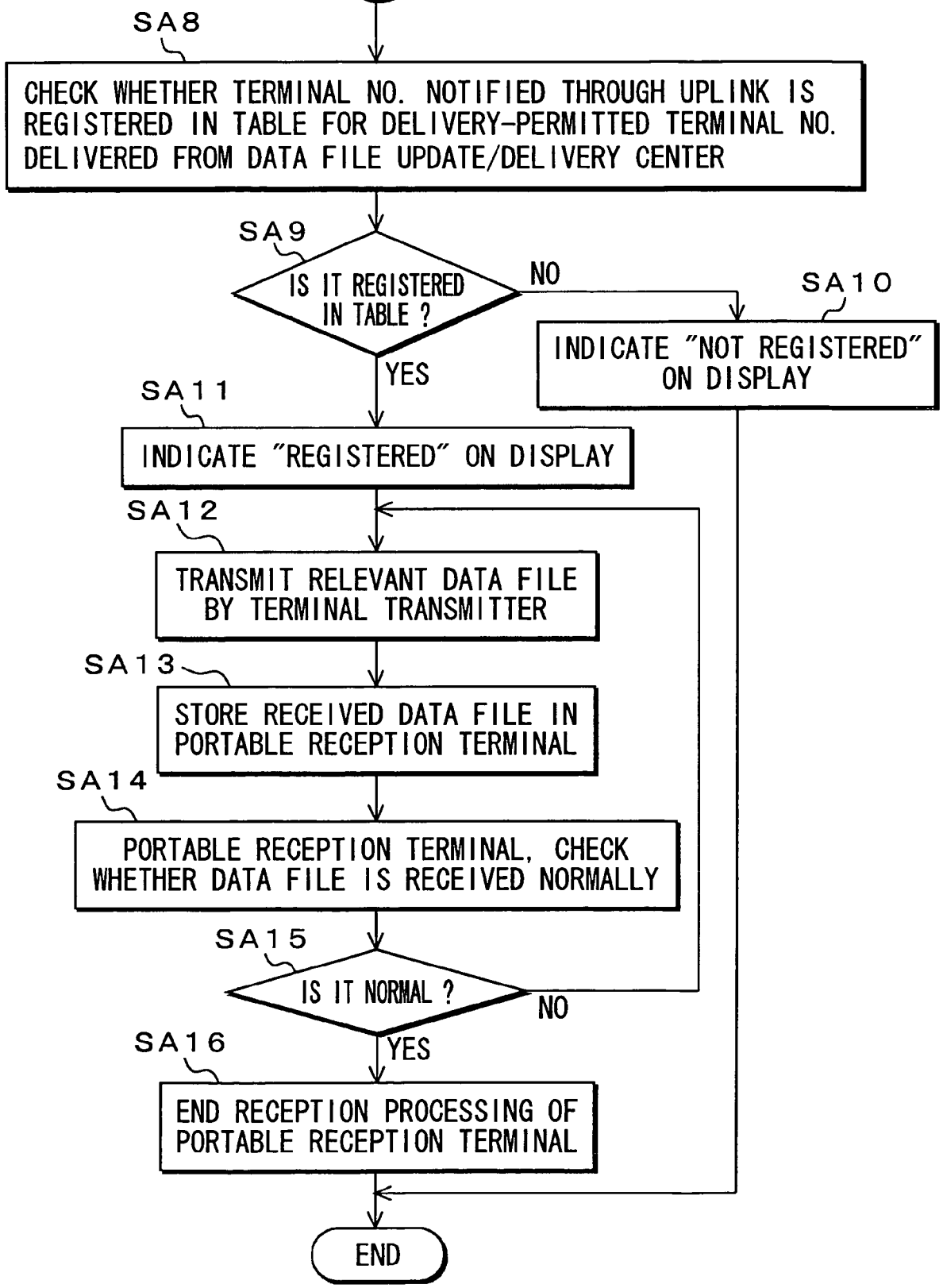

FIGS. 4A and 4B are flowcharts of a first operation example of an embodiment of the contents-delivery system according to the present invention. An example of processing of contents-delivery from the terminal transmitter 3 to the portable reception terminal 2 will be explained. It is to be noted that the flowcharts of FIGS. 4A and 4B show a procedure for delivering contents from the terminal transmitter 3 to the portable reception terminal 2 in a case where the terminal transmitter 3 and the portable reception terminal 2 are present in a 1-to-1 relationship. Further, an uplink from the portable reception terminal 2 utilizes a laser beam from the index laser 29.

At Step SA1, the system controller 17 in the terminal transmitter 3 turns on beforehand the visualization light 23 by red, for example.

At Step SA2, the user of the portable reception terminal 2, who is a user of the contents-delivery system, moves to a position from which he or she can see the visualization light 23. As described above, the light guide 15 equipped to the terminal transmitter 3 prevents the user from seeing the visualization light 23 unless he or she comes to a predetermined position with respect to the terminal transmitter 3. With this, the user can confirm whether he or she can receive delivered contents, by utilizing the portable reception terminal 2 by himself or herself.

The user of the portable reception terminal 2, at the position where he or she can see the visualization light 23, presses an operation button that turns on the index laser 29 so that the index laser 29 may emit a laser beam. Then, he or she adjusts a direction of the portable reception terminal 2 so that the terminal transmitter 3 can be irradiated with the laser beam from the index laser 29.

Since the laser beam from the index laser 29 is visible, the user can easily adjust the portable reception terminal 2 in a predetermined direction.

In this case, the system controller 30 in the portable reception terminal 2 repeatedly superimposes a terminal number registered in the memory 31 etc. beforehand, whose number is identification information to identify itself, on the laser beam from the index laser 29 and transmits it to the terminal transmitter 3.

At Step SA3, the system controller 17 in the terminal transmitter 3 checks whether the index sensor 22 has detected the laser beam.

At Step SA4, if the index sensor 22 has not detected the laser beam, the process returns to step SA2 where it waits for communication from the portable reception terminal 2.

At Step SA5, if the index sensor 2 has detected the laser beam, on the other hand, the system controller 17 in the terminal transmitter 3 decides that the portable reception terminal 2 has moved into a radio-wave receivable range and switches a light-up color of the visualization light 23 to, for example, green.

With this, the user can recognize that the portable reception terminal 2 is ready for receiving a download radio-wave.

At Step SA6, the system controller 17 in the terminal transmitter 3 checks whether the terminal number is superimposed on the laser beam received by the index sensor 22.

At Step SA7, if the terminal number is not superimposed on the received laser beam, the process returns to step SA5.

At Step SA8, if the terminal number is superimposed on the received laser beam, on the other hand, the system controller 17 in the terminal transmitter 3 checks whether the terminal number posted by the portable reception terminal 2 is registered in a table for delivery-permitted terminal number, shown in FIG. 4B, stored in the memory 18 etc.

It is to be noted that FIG. 5 shows one example of the table 101 for delivery-permitted terminal number. In the table 101 for delivery-permitted terminal number, the terminal number of the portable reception terminal 2 that is registered beforehand so that delivery of contents is permitted on it is correlated with a data file name of specified contents.

At Step SA9, if the terminal number posted by the portable reception terminal 2 is not registered in the table 101 for delivery-permitted terminal number, the process goes to step SA10 and, otherwise, goes to step SA11.

At Step SA10, if the terminal number posted by the portable reception terminal 2 is not registered in the table 101 for delivery-permitted terminal number, the system controller 17 in the terminal transmitter 3 utilizes the function of communication from the transmission section 11 to the reception section 25, to notify the portable reception terminal 2 of delivery permission/rejection information to the effect that the terminal number is not registered and so delivery is not permitted. The portable reception terminal 2 in turn indicates on, for example, the display 34 that the terminal number is not registered and so delivery is not permitted and ends the process.

At Step SA11, if it is decided at step SA9 that the terminal number posted by the portable reception terminal 2 is registered in the table 101 for delivery-permitted terminal number, the system controller 17 in the terminal transmitter 3 utilizes the function of communication from the transmission section 11 to the reception section 25, to notify the portable reception terminal 2 of delivery permission/rejection information to the effect that the terminal number is registered and so delivery is permitted. The portable reception terminal 2 in turn indicates on, for example, the display 34 that the terminal number is registered and so delivery is permitted.

It is to be noted that the processing of posting the delivery permission/rejection information to the user described at steps SA10 and SA11 above may be omitted.

At Step SA12, if the terminal number posted by the portable reception terminal 2 is registered in the table 101 for delivery-permitted terminal number, the system controller 17 in the terminal transmitter 3 transmits a data file identified by a data file name that corresponds to this terminal number registered in the table 101 for delivery-permitted terminal number.

That is, it reads the corresponding data file stored in the cache memory 12 by using the bridge IC 13, converts this parallel data into serial data by using the serializer 14, so that the serial data is transmitted from the transmission section 11 by using a millimetric-wave.

At Step SA13, when the system controller 30 in the portable reception terminal 2 detects reception of the radio-wave at the radio-wave sensor 33, it stores the data file received from the terminal transmitter 3 in the cache memory 26. That is, it converts the received millimetric-wave into an electric signal at the reception section 25, converts this serial data into parallel data at the deserializer 28, so that the parallel data is stored in the cache memory 26 by using the bridge IC 27.

It is to be noted that when having detected reception of a predetermined radio-wave at the radio-wave sensor 33, the system controller 30 in the portable reception terminal 2 may indicate on the display 34 information to the effect that communication has been established. With this, the user can be permitted to try it again if communication cannot be established.

At Step SA14, the system controller 30 in the portable reception terminal 2 checks whether the received data file is normal.

At Step A15, if the received data file is not normal, the process returns to, for example, step SA12 to repeat transmission of the data file until it is decided to be normal when received.

At Step SA16, if the received data file is normal, the system controller 30 in the portable reception terminal 2 ends the reception processing.

To stop transmission processing on the side of the terminal transmitter 3, the process notifies the terminal transmitter 3 through an uplink that download is finished. In this case, the index laser 29 is not always on, so that it may be notified through such an uplink as to utilize the function of communication from the wireless communication section 35 in the portable reception terminal 2 to the wireless communication section 20 in the portable reception terminal 3.

With this, contents are delivered between the terminal transmitter 3 and the portable reception terminal 2 through wireless communication.

<Second Operation Example of an Embodiment of a Contents-Delivery System According to the Present Invention>

Figure 6A:
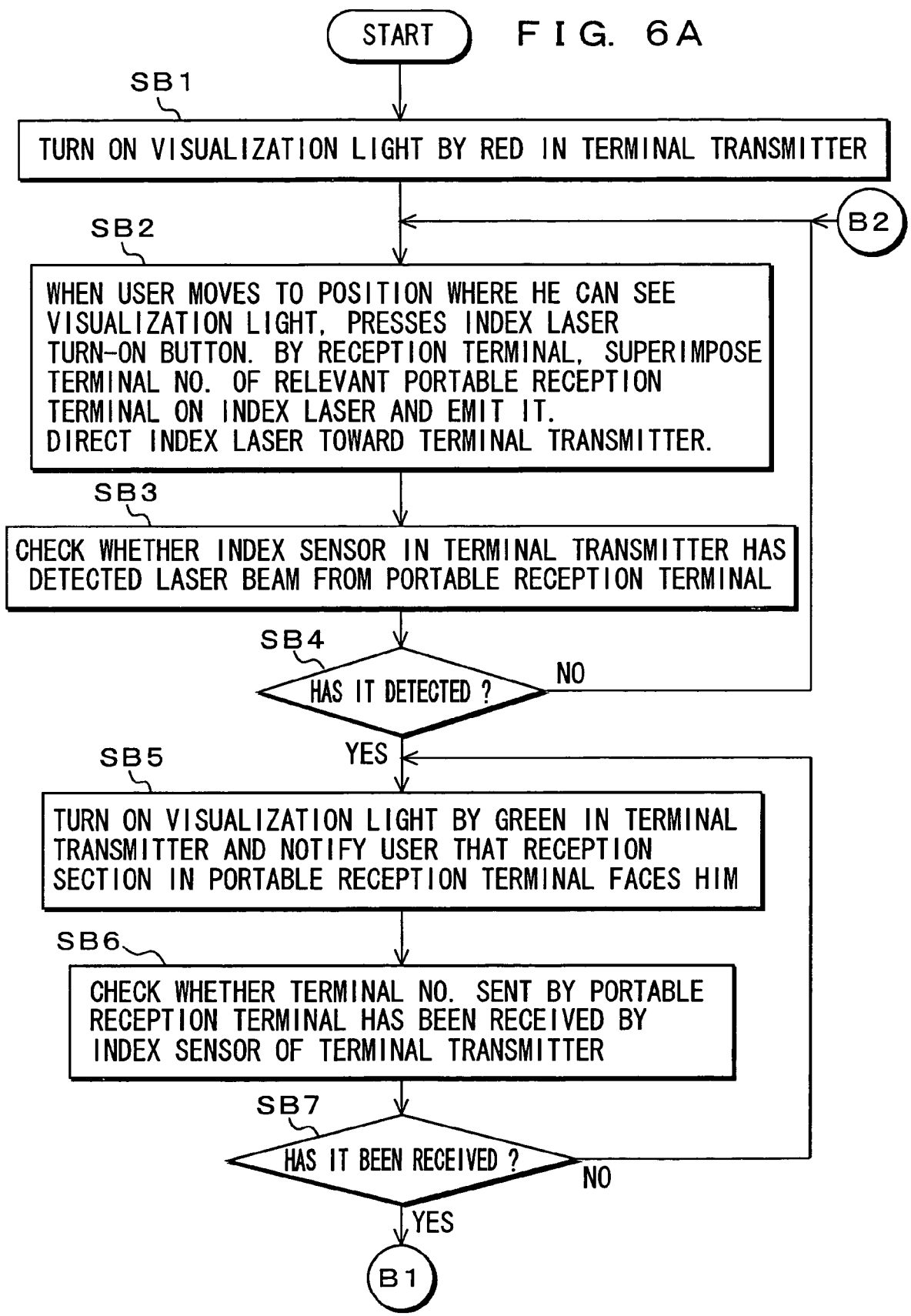
FIGS. 6A and 6B are flowcharts of a second operation example of the embodiment of the contents-delivery system according to the present invention.
Figure 6B:
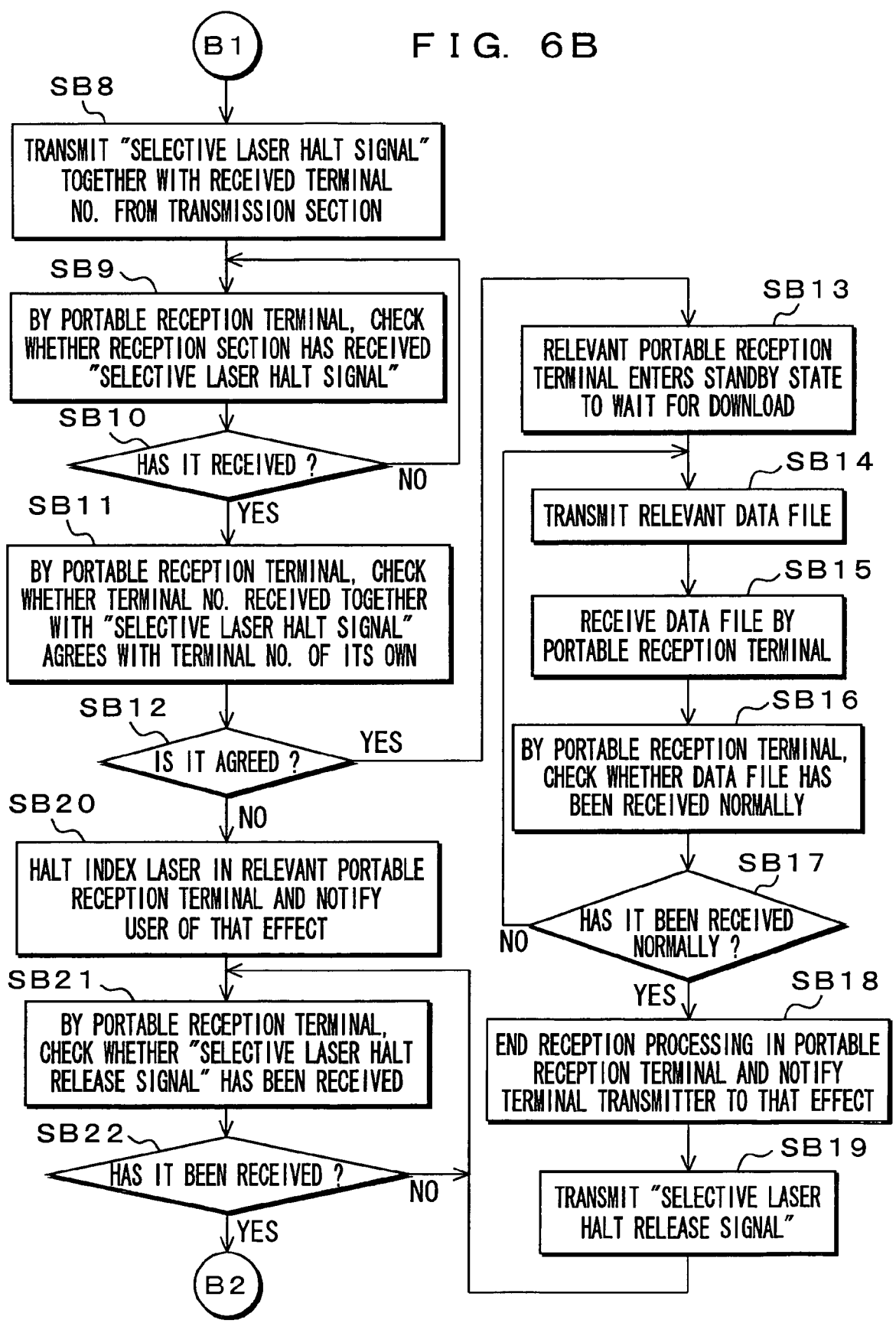

FIGS. 6A and 6B are flowcharts of a second operation example of an embodiment of the contents-delivery system according to the present invention. An example of processing of contents-delivery from the terminal transmitter 3 to the portable reception terminal 2 will be explained. It is to be noted that the flowcharts of FIGS. 6A and 6B show a procedure for delivering contents from the terminal transmitter 3 to an arbitrary one of the portable reception terminals 2 in a case where the terminal transmitter 3 and the portable reception terminals 2 are present in a 1-to-n relationship. Further, an uplink from the portable reception terminal 2 utilizes a laser beam from the index laser 29.

If there is a plurality of users in the radio-wave reception range shown in FIG. 1 and the index lasers 29 in the respective portable reception terminals 2 have started emission of laser beams almost simultaneously caused by a download request, there is a possibility that each of the users of the respective portable reception terminals 2 cannot decide whether the terminal transmitter 3 is irradiated with the laser beam of the index laser 29 in his own portable reception terminal 2 or with that in any other user's portable reception terminal 2.

To solve this problem, in a case where there is a plurality of users in the radio-wave reception range, control is conducted in such a manner that the portable reception terminal 2 of any of the users for whom communication has not been established may be notified that effect and, simultaneously, the relevant index laser 29 may be stopped in irradiation temporarily. This will be described in detail below.

At Step SB1, the system controller 17 in the terminal transmitter 3 turns on beforehand the visualization light 23 by red, for example.

At Step SB2, the user of the portable reception terminal 2, who is a user of the contents-delivery system, moves to a position from which he or she can see the visualization light 23. Next, the user of the portable reception terminal 2, at the position where he or she can see the visualization light 23, presses the operation button that turns on the index laser 29 so that the index laser 29 may emit a laser beam. Then, he or she adjusts a direction of the portable reception terminal 2 so that the terminal transmitter 3 can be irradiated with the laser beam from the index laser 29.

In this case, the system controller 30 in the portable reception terminal 2 repeatedly superimposes a terminal number of its own terminal registered in the memory 31 etc. on the laser beam from the index laser 29 beforehand and transmits it to the terminal transmitter 3.

At Step SB3, the system controller 17 in the terminal transmitter 3 checks whether the index sensor 22 has detected the laser beam.

At Step SB4, if the index sensor 22 has not detected the laser beam, the process returns to Step SB2 where it waits for communication from the portable reception terminal 2.

At Step SB5, if the index sensor 2 has detected the laser beam, on the other hand, the system controller 17 in the terminal transmitter 3 decides that any one of the portable reception terminals 2 has moved into a radio-wave receivable range and switches a light-up color of the visualization light 23 to, for example, green.

If there is a plurality of users in the radio-wave reception range shown in FIG. 1 and the index lasers 29 in the respective portable reception terminals 2 have started emission of laser beams almost simultaneously caused by a download request, at this point in time each of the users cannot always recognize that his or her own portable reception terminal 2 is ready for receiving a download radio-wave.

At Step SB6, the system controller 17 in the terminal transmitter 3 checks whether the terminal number is superimposed on the laser beam received by the index sensor 22.

At Step SB7, if the terminal number is not superimposed on the received laser beam, the process returns to Step SB5.

At Step SB8, if the terminal number is superimposed on the received laser beam, on the other hand, the system controller 17 in the terminal transmitter 3 transmits from the transmission section 11 together with the terminal number received from any one of the portable reception terminals 2 a "selective laser halt signal", which is an exclusive control signal that stops emission of a laser beam from the index laser 29 in this portable reception terminal 2.

At Step SB9, the system controller 30 in the portable reception terminal 2 checks whether the reception section 15 has received the terminal number and the selective laser halt signal.

At Step SB10, if the reception section 15 has not received the terminal number or the selective laser halt signal, the process returns to step SB9.

At Step SB11, if the reception section 15 has received the terminal number and the selective laser halt signal, the system controller 30 in the portable reception terminal 2 separates the terminal number from the received signal and checks whether this received terminal number agrees with the terminal number of its own terminal number in the memory 31 etc.

At Step SB12, if they agree, the process goes to step SB13 and, otherwise, goes to step SB20.

At Step SB13, if the received terminal number agrees with the terminal number of its own terminal, the system controller 30 in the portable reception terminal 2 decides that an index laser beam emitted from its own terminal has been recognized and waits for download.

Further, it notifies the terminal transmitter 3 that it has entered a download wait state, through an uplink due to the index laser 29.

At Step SB14, the system controller 17 in the terminal transmitter 3 transmits from the transmission section 11 a data file identified by a data file name that corresponds to the terminal number registered in the table 101 for delivery-permitted terminal number shown in FIG. 5.

At Step SB15, when having detected reception of a radio-wave by the radio-wave sensor 33, the system controller 30 in the portable reception terminal 2 starts reception processing.

At Step SB16, the system controller 30 in the portable reception terminal 2 checks whether the received data file is normal.

At Step SB17, if the received data file is not normal, the process returns to, for example, step SB14, to repeat transmission of the data file until it is decided to be normal when received.

At Step SB18, if the received data file is normal, the system controller 30 in the portable reception terminal 2 ends the reception processing. Further, it notifies the terminal transmitter 3 that the download has ended, through an uplink due to the index laser 29.

At Step SB19, when having received a reception-completion signal from the portable reception terminal 2, the system controller 17 in the terminal transmitter 3 transmits from the transmission section 11 a "selective laser-halt release signal", which is an exclusive control release signal that restarts emission of a laser beam from the index laser 29 in the portable reception terminal 2.

At Step SB20, if it is decided at step SB12 that the received terminal number disagrees with the terminal number of its own terminal, the system controller 30 in the portable reception terminal 2 stops the index laser 29 in irradiation. Further, it indicates on the display 34 that, for example, it has stopped irradiation by the index laser 29 in a condition where it is waiting for ending of download at the other terminals.

At Step SB21, the system controller 30 in the portable reception terminal 2 checks whether the selective laser-halt release signal is received from the terminal transmitter 3.

At Step SB22, if the selective laser-halt release signal is not received from the terminal transmitter 3, the process returns to step sB21. Otherwise, the process returns to step SB2.

In such a manner, if there is a plurality of users in the radio-wave reception range shown in FIG. 1 and the index lasers 29 in the respective portable reception terminals 2 have started emission of laser beams almost simultaneously caused by a download request, it is possible to notify the user of the portable reception terminal 2 on which an uplink is not established that the other users are engaged in downloading and cause him or her to wait.

It is to be noted that although the portable reception terminal 2, when having received the selective laser-halt release signal, turns on its index laser 29 again as far as the operation button, not shown, is held pressed, in order to prevent the plurality of portable reception terminals 2 from simultaneously turning on their respective index lasers 29, timings at which these index lasers in the portable reception terminals 2 are turned on again may be made different from each other.

In such a manner, in the contents-delivery system 1 of the present embodiment, it is possible to deliver contents between the terminal transmitter 3 and the portable reception terminal 2 which are installed as separated from each other by a predetermined distance of about a few meters. Since the terminal transmitter 3 and the portable reception terminal 2 do not come in contact with each other mechanically, the terminal transmitter 3 has a high degree of freedom of an installation position. Further, it has high durability because it is not subject to friction etc. due to attachment and detachment.

Although the contents-delivery system 1 of the present embodiment has utilized a millimetric-wave as the transmission carrier, it is applicable also to optical communication by use of a visible laser beam. That is, although an alignment mechanism is necessary to deliver contents between the terminal transmitter 3 and the portable reception terminal 2 which are installed as separated from each other by the predetermined distance because the laser beam also has high directivity, they can be aligned with each other easily by using optical position confirmation means that utilizes an index laser etc. Furthermore, it is applicable also to optical communication that utilizes an invisible laser beam having a wavelength of, for example, 850 nm.

<Processing of Updating Cache Memory in Terminal Transmitter>

Data files of contents delivered from the terminal transmitter 3, which are stored in the cache memory 12 as described above, need to be updated in order to deliver new contents or such contents as to be desired by the user of the portable reception terminal 2.

Figure 7:
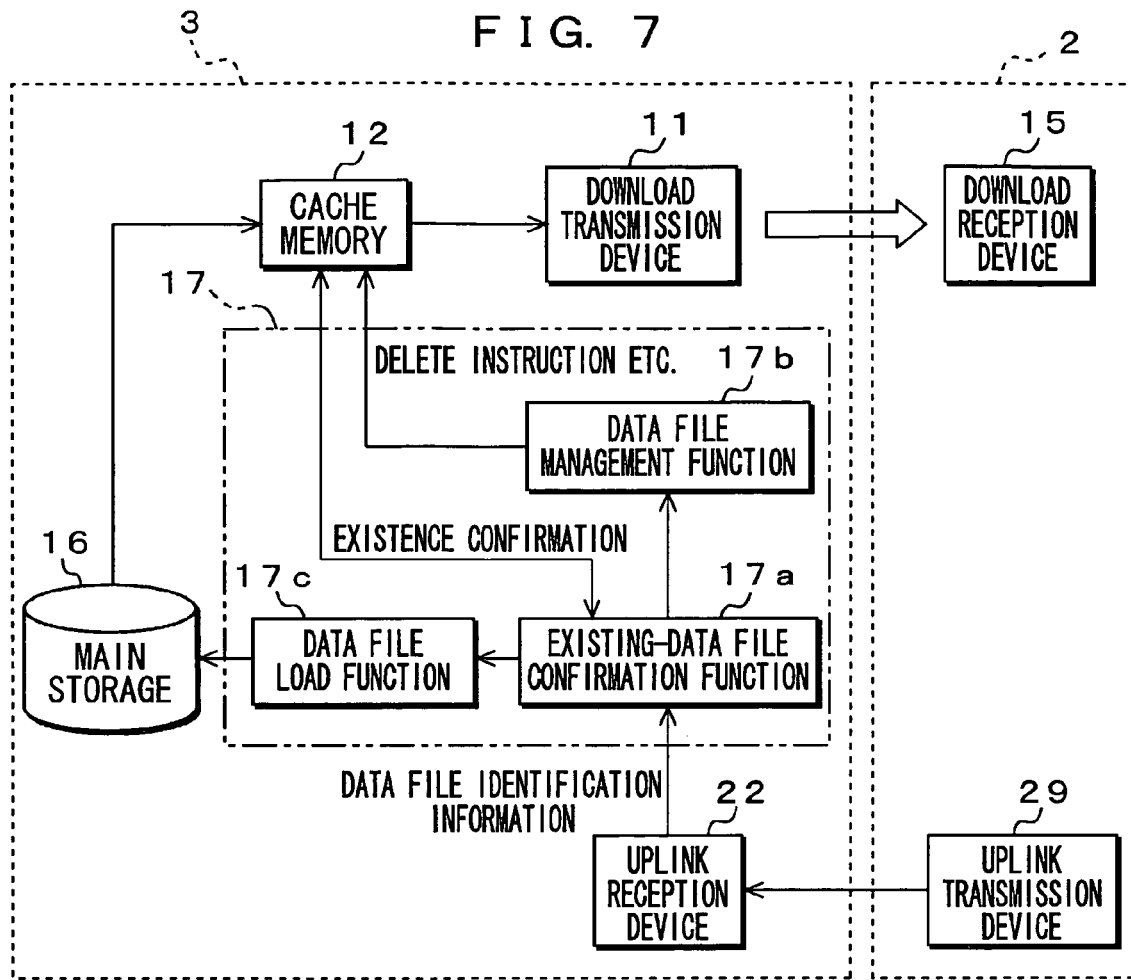
FIG. 7 is a block diagram for illustrating a configuration of a file management function of the terminal transmitter.

FIG. 7 is a block diagram for showing a configuration of a file management function of the terminal transmitter 3. This FIG. 7 mainly illustrates a function relating to management of input/output of a data file between the cache memory 12 and the main storage 16. Processing of updating the cache memory 12 will be described below.

The system controller 17 in the terminal transmitter 3 is provided with an existing-data file confirmation function 17*a*, a data file management function 17*b*, and a data file load function 17*c* as update means for managing input/output of a data file between the cache memory 12 and the main storage 16. Those functions are realized by performing a program stored in, for example, the memory 18.

The existing-data file confirmation function 17*a* always recognizes which data file is stored in the cache memory 12.

The data file management function 17*b* counts the number of times each data file is downloaded to the portable reception terminal 2. Further, depending on the number of times of downloading each of the data files, this function instructs, for example, to delete the data file from the cache memory 12 and copy it from the main storage 16 to the cache memory 12.

The data file load function 17c copies a data file stored in the main storage 16 to the cache memory 12, in response to an instruction from the data file management function 17b.

Since input/output of the data file is managed by the update means shown in FIG. 7, the data file is stored together with management information in the main storage 16 and the cache memory 12.

Figure 8:
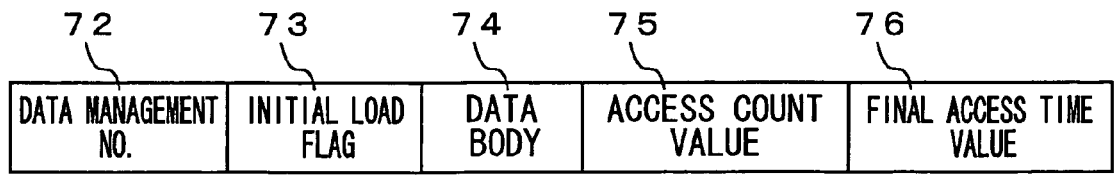
FIG. 8 is an explanatory diagram of a configuration of a data file and management information stored in a main storage.

FIG. 8 is a diagram for describing a configuration of the data file and the management information stored in the main storage 16.

In the main storage 16, a data management number 72 that identifies data, an initial load flag 73 that is one example of the management information and identifies a data file to be copied to the cache memory 12 upon initial setting, a data body 74, an access count value 75 that is one example of the management information and indicates the number of downloading times, and a final access time value 76 that is one example of the management information and indicates a final download date/time are stored as correlated with each other.

Figure 9:
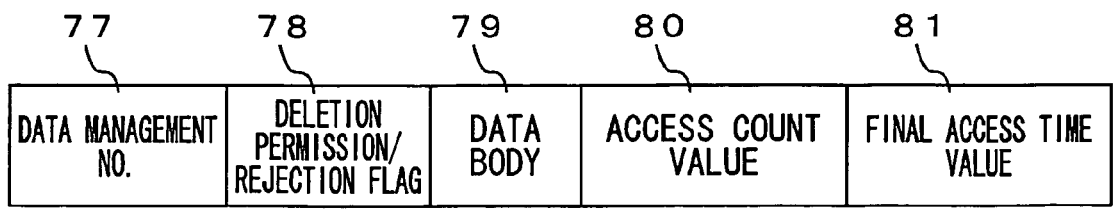
FIG. 9 is an explanatory diagram of a configuration of a data file and management information stored in a cache memory.

FIG. 9 is a diagram for describing a configuration of the data file and the management information stored in the cache memory 12.

In the cache memory 12, a data management number 77 that identifies data, a deletion permission/rejection flag 78 that is one example of the management information and indicates permission/rejection of deletion, a data body 79, an access count value 80 that is one example of the management information and indicates the number of down-loading times, and a final access time value 81 that is one example of the management information and indicates a final download date/time are stored as correlated with each other.

The following will describe an example of the input/output management processing of a data file in the cache memory 12 and the main storage 16.

It is supposed that the main storage 16 can store n number of data files and the cache memory 12, m number of data files. It is to be noted that m≦n.

First, as initial setting, pre-specified m number of data files of the data files stored in the main storage 16 are copied to the cache memory 12. For those pre-specified data files, the initial load flag 73 shown in FIG. 8 is set on, for example.

This initial setting is performed at a timing for updating the data files stored in the main storage 16, for example.

The following will describe in detail an initial setting operation of copying the data files in the main storage 16 to the cache memory 12.

Figure 10:
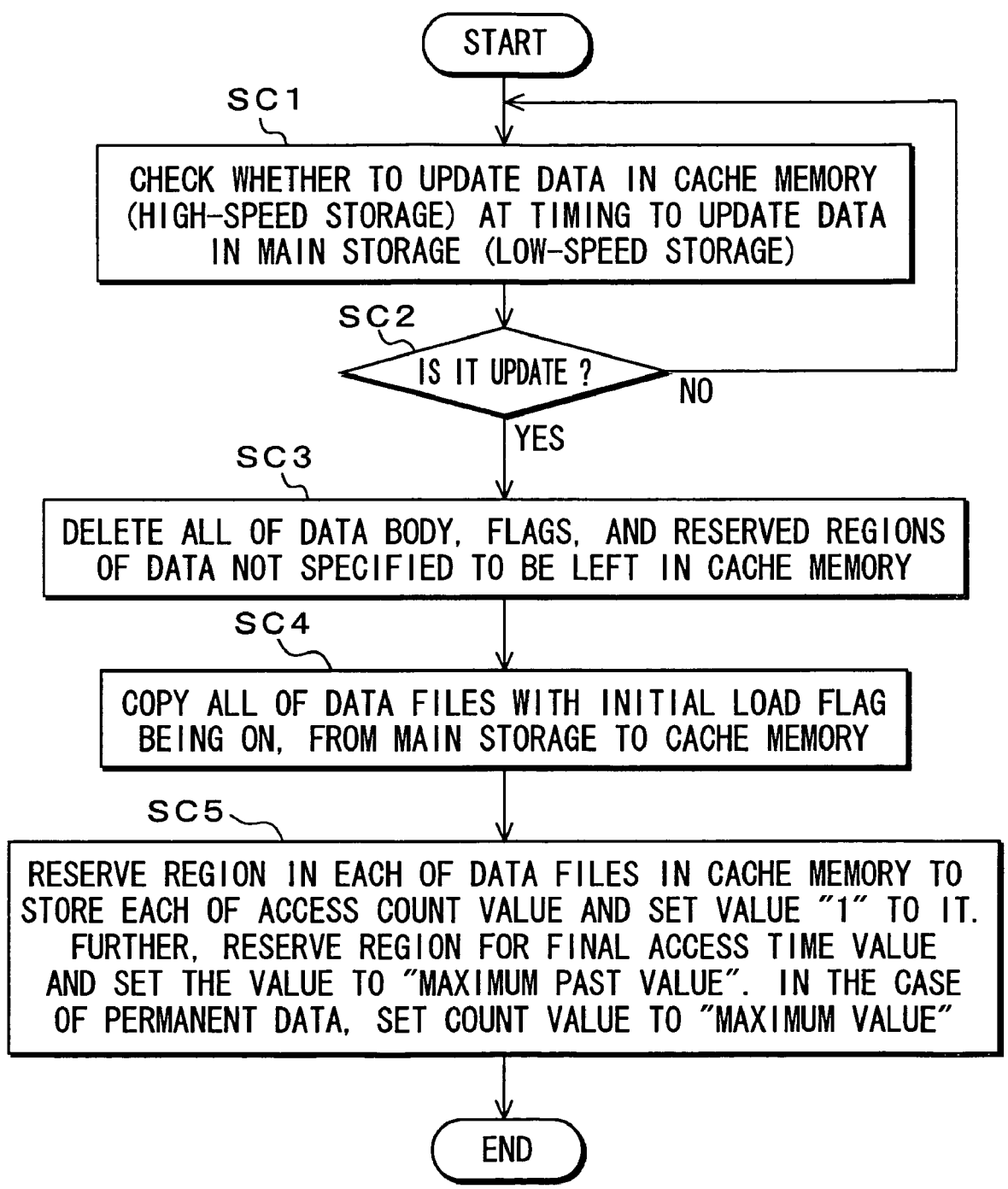
FIG. 10 is a flowchart of an example of update processing upon initial setting of the cache memory.

FIG. 10 is a flowchart of an example of update processing upon initial setting of the cache memory 12. The flowchart of FIG. 10 shows a procedure in which a data file in the cache memory 12 is deleted at a timing of updating the main storage 16 and replaced by a new data file.

At Step SC1, the process checks whether a data file stored in the cache memory 12 is to be updated at a timing of updating of data in the main storage 16.

At Step SC2, if it is not the timing of updating the main storage 16 currently, the process decides it is not a timing of updating the cache memory 12 and returns to step SC1.

At Step SC3, if the data file in the cache memory 12 is to be updated, the data file management function 17b deletes all of a data body, the flags, and reserved regions of the data files from the cache memory 12 except those data files on which the deletion permission/rejection flag 78 illustrated in FIG. 9 is set on.

It is noted that the deletion permission/rejection flag 78 specifies also whether to delete a value of the access count value 80 of the data or whether not to delete the count value so that it may be left as it is.

At Step SC4, the data file load function 17c copies all of the data files on which the initial load flag 73 illustrated in FIG. 8 is set on, from the main storage 16 to the cache memory 12.

At Step SC5, the data file management function 17b reserves a region in each of the data files in the cache memory 12 to store each of the access count values 80 illustrated in FIG. 9 and sets it to value "1". Furthermore, it reserves a region for the final access time value 81 and sets the value to "maximum past value". In the case of permanent data (residential contents), the count value is set to "maximum value".

Through the above processing, it is possible to store beforehand a data file of contents possibly requested to be acquired, in the cache memory 12.

By the above update processing, if the main storage 16 is to be updated at a cycle of one week, a data file specified to be left as it is by the deletion permission/rejection flag 78 will be left as it is in the cache memory 12 even in the next week after the data files in the main storage 16 have been updated. Therefore, even if this data file is not stored in the main storage 16, such a condition continues to the next weak that the data can be downloaded.

However, as described later, if the number of the download requests is smaller than the number of the other data pieces updated, they are deleted from the cache memory 12 automatically, so that afterwards no new request can be accepted. It is thus possible to give such data a status as "data that will be lost unless requested", which is effective as one of service variations.

The following will describe processing of updating the cache memory 12 by use of a download request from the portable reception terminal 2.

If there is no relevant data file in the cache memory 12 when it has received a download request from the portable reception terminal 2, the existing-data file confirmation function 17a notifies the data file management function 17b of a name of the data file requested by the portable reception terminal 2.

Further, it instructs the data file load function 17c to copy the relevant data file from the main storage 16 to the cache memory 12.

In this case, to download data files to the portable reception terminal 2, it manages the number of times of downloading for each of the data files, to determine the data files to be deleted when a new data file is to be copied to the cache memory 12.

Figure 11:
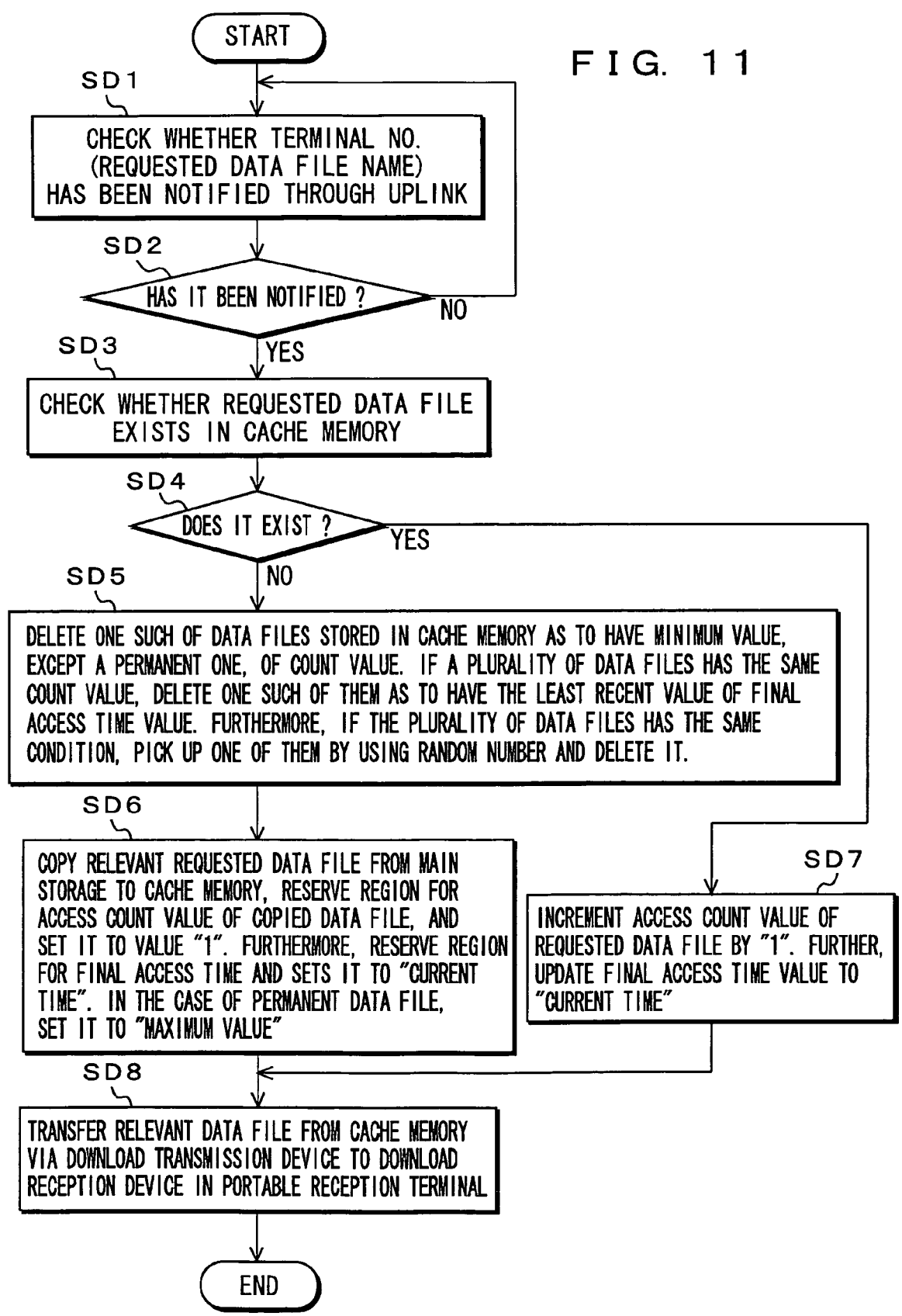
FIG. 11 is a flowchart of an example of update processing on the cache memory owing to a download request.

FIG. 11 is a flowchart of an example of update processing on the cache memory 12 owing to a download request. Details of processing to update data files in the cache memory 12 in response to a download request from the portable reception terminal 2 will be described.

The flowchart of FIG. 11 indicates a procedure in which a data file that has been copied to the cache memory 12 upon initial setting is deleted from the cache memory 12 depending on how many times downloading has been performed and replaced by a new data file.

At Step SD1, the terminal transmitter 3 checks whether a terminal number is posted from the index laser 29 etc. through an uplink from the portable reception terminal 2.

At Step SD2, if there is no uplink from the portable reception terminal 2, the process returns to step SD1.

At Step SD3, if the terminal number is posted through the uplink from the portable reception terminal 2, the process checks whether relevant data file is stored in the cache memory 12, by using the existing-data file confirmation function 17a.

At Step SD4, if there is no data file requested to be acquired in the cache memory 12, the process goes to step SD5 and, otherwise, goes to step SD7.

At Step SD5, if there is no data file requested to be acquired in the cache memory 12, the process deletes one such of data files stored in the cache memory 12 as to have a minimum value, except a permanent one, of the access count value 80 shown in FIG. 9, by using the data file management function 17b.

If the plurality of data files has the same count value, the process deletes one such of them as to have the least recent value of the final access time value 81. Furthermore, if the plurality of data files has the same condition, the process picks up one of them by using a random number and deletes it.

At Step SD6, the process copies the acquisition-requested data file from the main storage 16 to the cache memory 12, by using the data file load function 17c. The process then reserves a region for the access count value 80 of the copied data file and sets it to value "1". Furthermore, the process reserves a region for the final access time value 81 and sets it to "current time". In the case of a permanent data file, the process sets it to "maximum value".

At Step SD7, if an acquisition-requested data file is present in the cache memory 12, on the other hand, the process increments the access count value 80 of the requested data file by "1" by using the data file management function 17b. If a maximum value has set already, the process holds it. Further, the process updates the final access time value 81 to "current time".

At Step SD8, a data file of acquisition-requested contents is read from the cache memory 12 by using the bridge IC 43 illustrated in FIG. 2 etc. and transferred via a download transmission device (transmission section) 11 to a download reception device (reception section) 25 in the portable reception terminal 2.

By the above processing, the data file of contents which is requested to be acquired from the portable reception terminal 2 is transmitted from the terminal transmitter 3 to the portable reception terminal 2. To the data file of the acquisition-requested contents, a value of the access counter value 80 shown in FIG. 9 is added, and the final access time value 81 is updated.

With this, in updating of data files stored in the cache memory 12, such contents as to have been downloaded many times are left in the cache memory 12 and such contents as to have been downloaded few times are deleted from the cache memory 12.

It is thus possible to utilize the cache memory 12 effectively and also to wait for popular contents in a condition where they can be delivered any time.

<Network Configuration of Contents-Delivery System>

By the way, the terminal transmitters 3 are installed on, for example, a street etc. In this condition, the terminal transmitters 3 are connected to a network and managed in order to update a data file of contents stored in the main storage 16 in each of the terminal transmitters 3.

Figure 12:
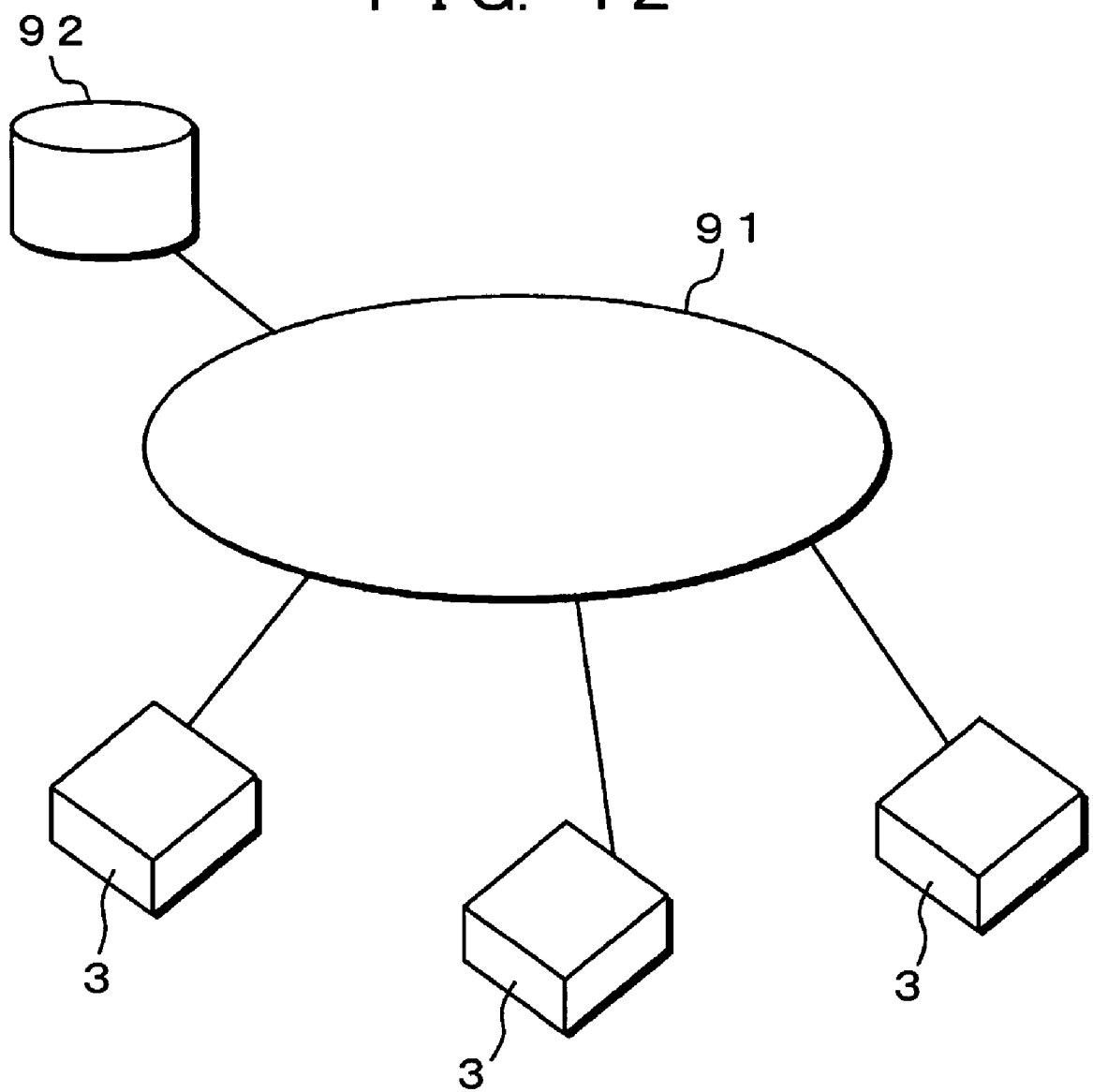
FIG. 12 is a block diagram for illustrating a network configuration of the contents-delivery system.

FIG. 12 is a block diagram of a network configuration of the contents-delivery system. In the contents-delivery system 1, the plurality of terminal transmitters 3 is connected to a network 91 such as the Internet.

To the network 91, a data file delivery server 92 is connected. The data file delivery server 92, which is one example of a server device, stores a data file of contents to be delivered from each of the terminal transmitters 3 to any portable reception terminal 2.

If various conditions are met, the data file delivery server 92 delivers one or a plurality of data files of contents via the network 91 to each of the terminal transmitters 3.

Each of the terminal transmitters 3 updates data files stored, for example, in the main storage 16 at a timing that the data file is delivered from the data file delivery server 92.

Then, as described above, in the terminal transmitters 3, data files stored in the cache memory 12 are updated at a timing that the data files stored in, for example, the main storage 16 are updated.

Therefore, to deliver data files of contents from the data file delivery server 92 to the terminal transmitters 3, a value of, for example, the initial load flag 73 illustrated in FIG. 8 is set for each of the data files so that management can be conducted in updating of the cache memory 12.

It is to be noted that the data files of contents can be delivered from the data file delivery server 92 to the terminal transmitters 3 during a regular lapse of time in, for example, every hour, every day, every week, or every month.

Further, the table for delivery-permitted terminal number etc. illustrated in FIG. 5 may also be delivered by the data file delivery server 92.

The present invention could well be applied to realization of a system in which an unspecified number of users own a contents-reception device and a contents-transmission device is installed on a street etc., to enable delivery of a large capacity of contents in short time.

Thus have been described the optical connector assemblies that are applied to the devices for optical communication, which are often attached and detached. It should be understood by those skilled in the art that various modifications, combinations, sub-combinations and alternations may occur depending on design requirements and other factors insofar as they are within the scope of the appended claims or the equivalents thereof.

What is claimed is:

1. A contents-delivery system which delivers contents by performing communication, the system comprising:
    a contents-transmission device transmitting the contents;
    a contents-reception device receiving the contents from the contents-transmission device;
    first communication means for performing communication from the contents-transmission device to the contents-reception device via a high-directivity transmission carrier;
    second communication means for performing communication at least from the contents-reception device to the contents-transmission device; and
    optical position confirmation means for confirming through optical irradiation whether a position of the contents-reception device with respect to the contents-transmission device is within a range in which the first communication means can communicate,
    wherein the optical position confirmation means confirms the position of the contents-reception device when the second communication means receives, from the contents-reception device, optical irradiation with the contents-reception device's terminal number added thereto,
    wherein the contents-transmission device comprises a memory means for storing a table that lists a terminal number of at least one contents-reception device and file names of corresponding delivery-permitted contents, and wherein the first communication means transmits to the contents-reception device a registration status and whether to permit a content delivery after the received contents-reception device's terminal number is compared with the terminal number stored in the table, wherein the contents-transmission device transmits a permitted terminal number and an exclusive control halt signal to the contents-reception device, wherein if the contents-reception device determines that the permitted terminal number is its own, the contents-reception device receives the contents and notifies the contents-transmission device; and wherein if the contents-reception device notifies the content-transmission device a completion of a reception, the contents-transmission device outputs another exclusive control halt signal to the contents-reception device.

2. The contents-delivery system according to claim 1, wherein the contents-reception device is provided with the optical position confirmation means, said optical position confirmation means including optical irradiation means for irradiating high-directivity visible light.

3. The contents-delivery system according to claim 2, wherein the contents-transmission device is provided with the optical position confirmation means, said optical position confirmation means comprising:
light detection means for receiving light from the optical irradiation means; and
notification means for notifying whether the light detection means has received the light.

4. The contents-delivery system according to claim 3, wherein the contents-transmission device starts processing of outputting contents when the light detection means has detected predetermined light.

5. The contents-delivery system according to claim 4, wherein the second communication means outputs an optical signal on which a control signal is superimposed from the optical irradiation means, and detects the control signal by the light detection means.

6. The contents-delivery system according to claim 5, wherein the contents-reception device outputs identification information that identifies its own terminal as a contents download request by using the optical signal from the optical irradiation means.

7. The contents-delivery system according to claim 6, wherein the contents-transmission device outputs contents identified by the identification information received, by using the first communication means.

8. The contents-delivery system according to claim 7, wherein the contents-transmission device outputs by using the first communication means an exclusive control signal that temporarily excludes reception of contents in any contents-reception device other than the contents-reception device identified by the identification information received.

9. The contents-delivery system according to claim 1, further comprising guidance means for guiding the position of the contents-reception device with respect to the contents-transmission device to a target position with which the first communication means can communicate.

10. The contents-delivery system according to claim 9, therein the guidance means includes:
light emitting means for indicating a position of the contents-transmission device; and
guide means for regulating a visible range of the light emitting means.

11. The contents-delivery system according to claim 1, wherein the first communication means includes wireless communication means that utilizes a millimetric-wave as the transmission carrier.

12. The contents-delivery system according to claim 1, wherein the first communication means includes optical communication means that utilizes a laser beam as the transmission carrier.

13. A contents-delivery system which delivers contents by performing communication, the system comprising:
a contents-transmission device transmitting the contents;
a contents-reception device receiving the contents from the contents-transmission device;
a first communication device performing communication from the contents-transmission device to the contents-reception device via a high-directivity transmission carrier;
a second communication device performing communication at least from the contents-reception device to the contents-transmission device; and
an optical position confirmation device confirming through optical irradiation whether a position of the contents-reception device with respect to the contents-transmission device is within a range in which the first communication device can communicate, wherein the optical position confirmation device confirms the position of the contents-reception device when the second communication device receives, from the contents-reception device, optical irradiation with the contents-reception device's terminal number added thereto, wherein the contents-transmission device comprises a memory means for storing a table that lists a terminal number of at least one contents-reception device and file names of corresponding delivery-permitted contents, and wherein the first communication device transmits to the contents-reception device a registration status and whether to permit a content delivery after the received contents-reception device's terminal number is compared with the terminal number stored in the table, wherein the contents-transmission device transmits a permitted terminal number and an exclusive control halt signal to the contents-reception device, wherein if the contents-reception device determines that the permitted terminal number is its own, the contents-reception device receives the contents and notifies the contents-transmission device; and wherein if the contents-reception device notifies the content-transmission device a completion of a reception, the contents-transmission device outputs another exclusive control halt signal to the contents-reception device.

14. A contents-transmission device which delivers contents by communicating with a contents-reception device, said contents-transmission device comprising:
first communication means for performing communication to the contents-reception device via a high-directivity transmission carrier;
second communication means for receiving communication at least from the contents-reception device;
optical position confirmation means for confirming through optical irradiation whether a position of the contents-reception device is within a range in which the first communication means can communicate; and
a memory means for storing a table that lists a terminal number of at least one contents-reception device and file names of corresponding delivery-permitted contents, wherein the optical position confirmation means confirms the position of the contents-reception device when the second communication means receives, from the contents-reception device, optical irradiation with the contents-reception device's terminal number added thereto, and wherein the first communication means transmits to the contents-reception device a registration status and whether to permit a content delivery after the received contents-reception device's terminal number is compared with the terminal number stored in the table, wherein the contents-transmission device transmits a permitted terminal number and an exclusive control halt signal to the contents-reception device, wherein if the contents-reception device determines that the permitted terminal number is its own, the contents-reception device receives the contents and notifies the contents-transmission device; and wherein if the contents-reception device notifies the content-transmission device a completion of a reception. the contents-transmission device outputs another exclusive control halt signal to the contents-reception device.

15. The contents-transmission device according to claim 14, wherein the optical position confirmation means includes:
light detection means for receiving high-directivity visible light irradiated from optical irradiation means equipped to the contents-reception device; and
notification means for notifying whether the light detection means has received the light.

16. The contents-transmission device according to claim 15, output processing of the contents starts when the light detection means has detected predetermined light.

17. The contents-transmission device according to claim 15, wherein the light detection means detects a control signal superimposed on the optical signal output from the optical irradiation means, in the second communication means.

18. The contents-transmission device according to claim 17, wherein the contents-transmission device is notified from the contents-reception device of identification information that identifies its own terminal as a contents download request by using the optical signal from the optical irradiation means; and
wherein an exclusive control signal that temporarily excludes reception of contents by any content reception device other than the content reception device identified by the identification information received is output by using the first communication means.

19. The contents-transmission device according to claim 14, further comprising guidance means for guiding the position of the contents-reception device to a target position with which the first communication means can communicate.

20. The contents-transmission device according to claim 19, wherein the guidance means includes:
light emitting means for indicating a position of its own device; and
guide means for regulating a visible range of the light emitting means.

21. A contents-transmission device which delivers contents by communicating with a contents-reception device, said contents-transmission device comprising:
first communication device performing communication to the contents-reception device via a high-directivity transmission carrier;
second communication device receiving communication at least from the contents-reception device;
optical position confirmation device confirming through optical irradiation whether a position of the contents-reception device is within a range in which the first communication device can communicate; and
a memory means for storing a table that lists a terminal number of at least one contents-reception device and file names of corresponding delivery-permitted contents, wherein the optical position confirmation device confirms the position of the contents-reception device when the second communication device receives, from the contents-reception device, optical irradiation with the contents-reception device's terminal number added thereto, and wherein the first communication device transmits to the contents-reception device a registration status and whether to permit a content delivery after the received contents-reception device's terminal number is compared with the terminal number stored in the table, wherein the contents-transmission device transmits a permitted terminal number and an exclusive control halt signal to the contents-reception device, wherein if the contents-reception device determines that the permitted terminal number is its own, the contents-reception device receives the contents and notifies the contents-transmission device; and wherein if the contents-reception device notifies the content-transmission device a completion of a reception, the contents-transmission device outputs another exclusive control halt signal to the contents-reception device.

22. A contents-reception device which receives delivery of contents by communicating with a contents-transmission device, said contents-reception device comprising:
first communication means for receiving communication from the contents-transmission device via a high-directivity transmission carrier;
second communication means for performing communication at least to the contents-transmission device;
an operation means for operating the second communication means to restart performing communication to the contents-transmission device upon receiving a user command, and
optical position confirmation means for confirming through optical irradiation whether a position with respect to the contents-transmission device is within a range in which the first communication means can communicate, wherein the first communication means receives a registration status and whether to permit a content delivery after the contents-reception device's terminal number is compared with a terminal number stored in the content-transmission, wherein the contents-transmission device transmits a permitted terminal number and an exclusive control halt signal to the contents-reception device, wherein if the contents-reception device determines that the permitted terminal number is its own, the contents-reception device receives the contents and notifies the contents-transmission device; and wherein if the contents-reception device notifies the content-transmission device a completion of a reception, the contents-transmission device outputs another exclusive control halt signal to the contents-reception device.

23. The contents-reception device according to claim 22, wherein the optical position confirmation means includes optical irradiation means for irradiating high-directivity visible light.

24. The contents-reception device according to claim 23, the optical irradiation means outputs an optical signal on which a control signal is superimposed, in the second communication means.

25. The contents-reception device according to claim 24, the optical irradiation means outputs identification information that identifies itself as a contents download request by using the optical signal.

26. A contents-reception device which receives delivery of contents by communicating with a contents-transmission device, said contents-reception device comprising:
   first communication device receiving communication from the contents-transmission device via a high-directivity transmission carrier;
   second communication device performing communication at least to the contents-transmission device;
   an operation means for operating the second communication means to restart performing communication to the contents-transmission device upon receiving a user command, and
   optical position confirmation device confirming through optical irradiation whether a position with respect to the contents-transmission device is within a range in which the first communication device can communicate,
   wherein the first communication device receives a registration status and whether to permit a content delivery after the contents-reception device's terminal number is compared with a terminal number stored in the content-transmission device,
   wherein the contents-transmission device transmits a permitted terminal number and an exclusive control halt signal to the contents-reception device,
   wherein if the contents-reception device determines that the permitted terminal number is its own, the contents-reception device receives the contents and notifies the contents-transmission device; and
   wherein if the contents-reception device notifies the content-transmission device a completion of a reception, the contents-transmission device outputs another exclusive control halt signal to the contents-reception device.

27. A contents-delivery method for delivering contents by performing communication between a contents-transmission devices and more than one contents-reception devices, said method comprising the steps of:
   by one of the more than one contents-reception devices, outputting identification information that identifies the one of the more than one contents-reception devices, as a download request;
   in response to the download request from each of the more than one contents-reception devices, by the contents-transmission device, outputting the identification information received from an arbitrary one of the more than one contents-reception devices and an exclusive control signal;
   by any one of the more than one contents-reception devices that has received the identification information and the exclusive control signal, performing contents-reception processing if the received identification information is of its own; and
   if the received identification information is not of its own, temporarily stopping the contents-reception processing by using the exclusive control signal, confirming the position of the contents-reception device when optical irradiation with a contents-reception device's terminal number added thereto is received,
   wherein the contents-transmission device comprises a memory means for storing a table that lists a terminal number of at least one contents-reception device and file names of corresponding delivery-permitted contents,
   transmitting to the contents-reception device a registration status and whether to permit a content delivery after the received contents-reception device's terminal number is compared with the terminal number stored in the table;
   by any one of the contents-reception devices that has received the identification information and the exclusive control signal and known that the received identification information is of its own, if having received contents, notifying the contents-transmission; and
   by the contents-transmission device, outputting an exclusive control halt signal when having received the reception completion signal from the one of the contents-reception devices.

* * * * *

UNITED STATES PATENT AND TRADEMARK OFFICE
CERTIFICATE OF CORRECTION

| | |
|---|---|
| PATENT NO. | : 7,639,951 B2 |
| APPLICATION NO. | : 11/135595 |
| DATED | : December 29, 2009 |
| INVENTOR(S) | : Tomoshi Hirayama |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Ninth Day of November, 2010

David J. Kappos
*Director of the United States Patent and Trademark Office*